(12) United States Patent
Suzuki et al.

(10) Patent No.: US 7,486,801 B2
(45) Date of Patent: Feb. 3, 2009

(54) MONITORING SYSTEM FOR MONITORING SURROUNDINGS OF VEHICLE

(75) Inventors: Tomoharu Suzuki, Anjo (JP); Kazuya Watanabe, Anjo (JP); Kosuke Sato, Anjo (JP); Jun Amano, Chiryu (JP); Katsuhiko Umeno, Kawasaki (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 680 days.

(21) Appl. No.: 11/236,591

(22) Filed: Sep. 28, 2005

(65) Prior Publication Data

US 2006/0072788 A1   Apr. 6, 2006

(30) Foreign Application Priority Data

Sep. 28, 2004   (JP) ............................. 2004-281910

(51) Int. Cl.
*G06K 9/00* (2006.01)
(52) U.S. Cl. ...................... 382/103; 348/148
(58) Field of Classification Search ................ 382/103, 382/104; 348/148
See application file for complete search history.

(56) References Cited

U.S. PATENT DOCUMENTS 5,444,478 A   8/1995   Lelong et al.
6,476,855 B1 *  11/2002   Yamamoto ................. 348/148
6,734,896 B2 *   5/2004   Nobori et al. .............. 348/148
6,985,171 B1 *   1/2006   Kuriya et al. .............. 348/148
7,110,021 B2 *   9/2006   Nobori et al. .............. 348/148

FOREIGN PATENT DOCUMENTS

| JP | 03-099952 | 4/1991 |
| JP | 2002-230698 | 8/2002 |
| WO | WO 01/25054 A | 4/2001 |

* cited by examiner

*Primary Examiner*—Tom Y Lu
(74) *Attorney, Agent, or Firm*—Sughrue Mion, PLLC (57) ABSTRACT

A monitoring system for monitoring surroundings of a vehicle by displaying images taken by a plurality of cameras provided at the vehicle on a display apparatus provided in a vehicle compartment includes an image processing portion. The image processing portion includes a boundary-determining portion for determining a boundary of the neighboring images taken by the plurality of cameras for synthesizing the neighboring images in a horizontal direction by approximating the boundary to an exponential curve, a horizontally normalizing portion for normalizing the neighboring images in a horizontal direction so that the boundary approximated to the exponential curve is converted into a linear vertical boundary, a vertically compensating portion for compensating a vertical displacement between the neighboring images on the linear vertical boundary, and a pixel-adjusting portion for adjusting the number of pixels of the synthesized image to the number of pixels suitable for displaying the synthesized image produced by the image processing portion on the display apparatus.

12 Claims, 8 Drawing Sheets

MONITORING SYSTEM FOR MONITORING SURROUNDINGS OF VEHICLE

CROSS REFERENCE TO RELATED APPLICATIONS

This application is based on and claims priority under 35 U.S.C. § 119 to Japanese Patent Application 2004-281910, filed on Sep. 28, 2004, the entire content of which is incorporated herein by reference.

FIELD OF THE INVENTION

The present invention generally relates to a monitoring system for monitoring surroundings of a vehicle. More particularly, the present invention pertains to a monitoring system for monitoring surroundings of a vehicle by displaying images taken by a plurality of cameras provided at the vehicle on a display apparatus provided in a vehicle compartment.

BACKGROUND

Recently, concurrently with popularization of navigation systems, the number of vehicles equipped with a monitoring system, which displays surroundings of a vehicle on a display monitor installed in a vehicle compartment, is increasing. The surroundings of the vehicle, for example, positions of other vehicles, conditions of obstacles, information of road signs such as center lines and stop lines, are displayed on a display apparatus of such as a back monitor utilized when moving the vehicle backward, a monitor for monitoring under a front part of a bumper, and a blind corner monitor for monitoring corner portions. Such monitoring systems are designed to reduce burden on a driver. Accordingly, considering large number of information desired by the driver to obtain while driving the vehicle, it is preferable that the monitoring system has good visibility in images displayed on the display apparatus, which enables a driver to obtain information desired while driving the vehicle at a glance without feeling strangeness. Further, it is naturally preferable that the images have wide field of view. Generally, field of view of human for a static object is approximately 200° when human focuses on a single point with his both eyes. It is said that a field of view of human in which human can recognize colors such as red, blue, and yellow is up to approximately 70°. Further, field of view of human when the human sees objects while he is moving decreases as the human moves faster, down to approximately 100° when the human is moving at the speed of 40 km/h, approximately half of the field of view of human for static objects. To avoid the field of view becoming narrow, drivers give much effort to maintain wide view angle by avoiding staring at a point. It is desired that the monitoring system described above preferably compensates such physiological limit of the driver or helps such effort thereof.

Figure 11:
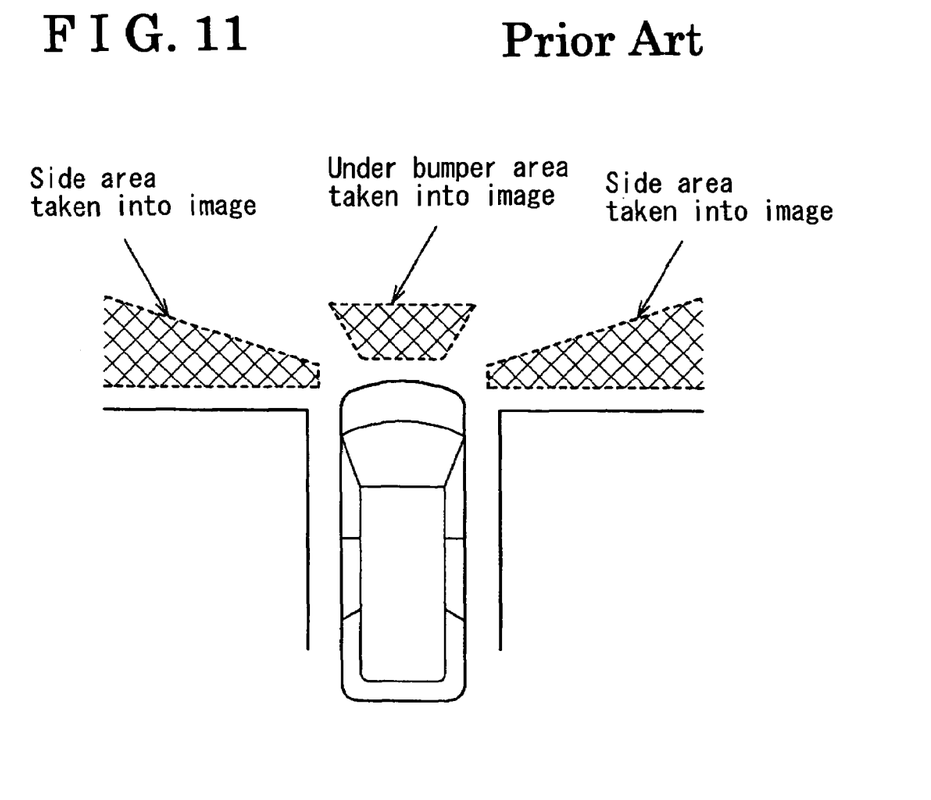
FIG. 11 represents a diagram illustrating an example of areas taken into images according to a conventional monitoring system for monitoring surroundings of a vehicle.
Figure 12:
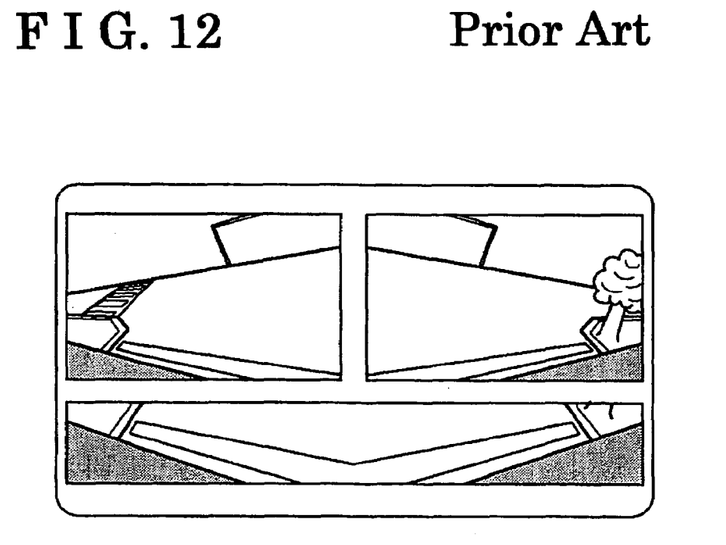
FIG. 12 represents a diagram illustrating an example of displayed images according to the conventional monitoring system for monitoring the surroundings of the vehicle.

However, a view angle of images taken by one camera is generally narrow, approximately 50° to 60°. Accordingly, only installing one camera to the vehicle cannot result in, sufficient width of the view angle. For overcoming such problem, various methods are proposed. For example, as illustrated in FIGS. 11 and 12, there is a conventional method for taking images of places invisible from a driver's seat and displaying the images in separate display frames on a display apparatus.

Further, JPH3-99952A describes another conventional monitoring system. The monitoring system includes one camera or plural cameras, means for converting a coordinate of an image transmitted from the camera(s) into another coordinate by means of perspective conversion, a means for synthesizing a single image from the converted images with considerations in a relation to the vehicle, a display (display apparatus) for displaying the images to an occupant (driver) of the vehicle. By the perspective conversion described in this document, the image(s) taken by the camera(s) is converted into a road surface coordinate (plane coordinate), of which an origin is taken from the center of the vehicle, x-axis is taken on a line in left to right direction relative to forward direction of the vehicle, y-axis is taken along the forward direction of the vehicle. Then, the synthesized image is displayed on the display apparatus. In the synthesized image, an illustration of own vehicle is displayed. Further, other vehicles, road signs and/or objects indicated by the plane coordinate are displayed.

The perspective conversion is also called as a viewpoint conversion. As seen in the document described above, by this conversion, a screen coordinate of the camera seen from a direction parallel to a X-Y plane configured from the X-axis and the Y-axis described above is converted into the plane coordinate seen from a direction perpendicular to the X-Y plane. Accordingly, such as poles and walls, objects standing upright on the X-Y plane, can be seen when they are displayed by the screen coordinate, but cannot be seen when they are displayed by the plane coordinate. In the plane coordinate, such objects are displayed as merely points or lines. In addition, sometimes the image converted into the plane coordinate gives a sense of strangeness to the driver. Though being not so extreme as in the example described in the document, when an image of three dimensional space taken from a certain viewpoint is converted by the viewpoint conversion, objects not existing on the plane, into which the objects are converted, are not correctly converted, resulting in producing strange images.

Besides, there is another method for monitoring surroundings of a vehicle. In this method, the conversion into the plane coordinate is not performed. Alternatively, places invisible from a driver's seat as illustrated in FIG. 11 is preferentially taken into images. Then, the images are separately displayed in display frames on the display apparatus. By this method, strangeness of the images can be reduced because the viewpoint of the images is regular one. However, when the images are separately displayed as described above, a driver need to recognize positional relations between the images to grasp surroundings of the vehicle, which gives difficulties in obtaining information of surroundings of the vehicle at a glance.

A need thus exists for a monitoring system for monitoring surroundings of a vehicle which enables a driver of the vehicle to grasp the surroundings of the vehicle as wide as possible at a glance without feeling strangeness. The present invention has been made in view of the above circumstances and provides such a monitoring system for monitoring surroundings of a vehicle.

SUMMARY OF THE INVENTION

According to an aspect of the present invention, a monitoring system for monitoring surroundings of a vehicle by displaying images taken by a plurality of cameras provided at the vehicle on a display apparatus provided in a vehicle compartment includes an image processing portion. The image processing portion includes a boundary-determining means for determining a boundary of the neighboring images taken by the plurality of cameras for synthesizing the neighboring images in a horizontal direction by approximating the boundary to an exponential curve, a horizontally normalizing means for normalizing the neighboring images in a horizontal direction so that the boundary approximated to the exponential curve is converted into a linear vertical boundary, a vertically compensating means for compensating a vertical displacement between the neighboring images on the linear vertical boundary, and a pixel-adjusting means for adjusting the number of pixels of the synthesized image to the number of pixels suitable for displaying the synthesized image produced by the image processing portion on the display apparatus.

According to a further aspect of the present invention, a monitoring system for monitoring surroundings of a vehicle by displaying images of the surroundings of the vehicle taken by a first camera and a second camera provided at the vehicle on a display apparatus provided in a vehicle compartment includes an image processing portion. The image processing portion includes a boundary-determining means for determining a boundary of neighboring first image taken by the first camera and second image taken by the second camera for synthesizing the neighboring first image and the second image in a horizontal direction by approximating the boundary to an exponential curve, a horizontally normalizing means for normalizing the neighboring first image and second image in a horizontal direction so that the boundary approximated to the exponential curve is converted into a linear vertical boundary, a vertically compensating means for compensating a vertical displacement between the neighboring first image and second image on the linear vertical boundary, and a pixel-adjusting means for adjusting the number of pixels of the synthesized image to the number of pixels suitable for displaying the synthesized image produced by the image processing portion on the display apparatus.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1A:
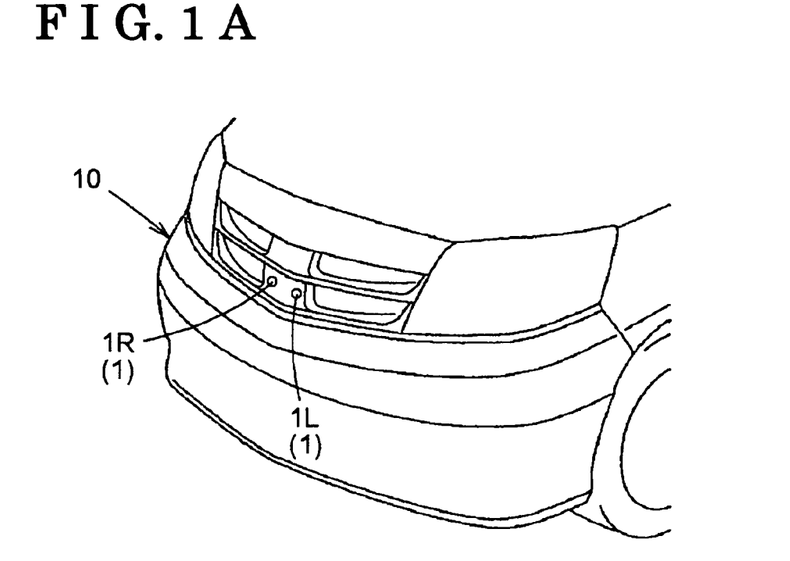
FIG. 1A and FIG. 1B represent a schematic diagram illustrating a monitoring system for monitoring surroundings of a vehicle according to the embodiment of the present invention.
Figure 1B:
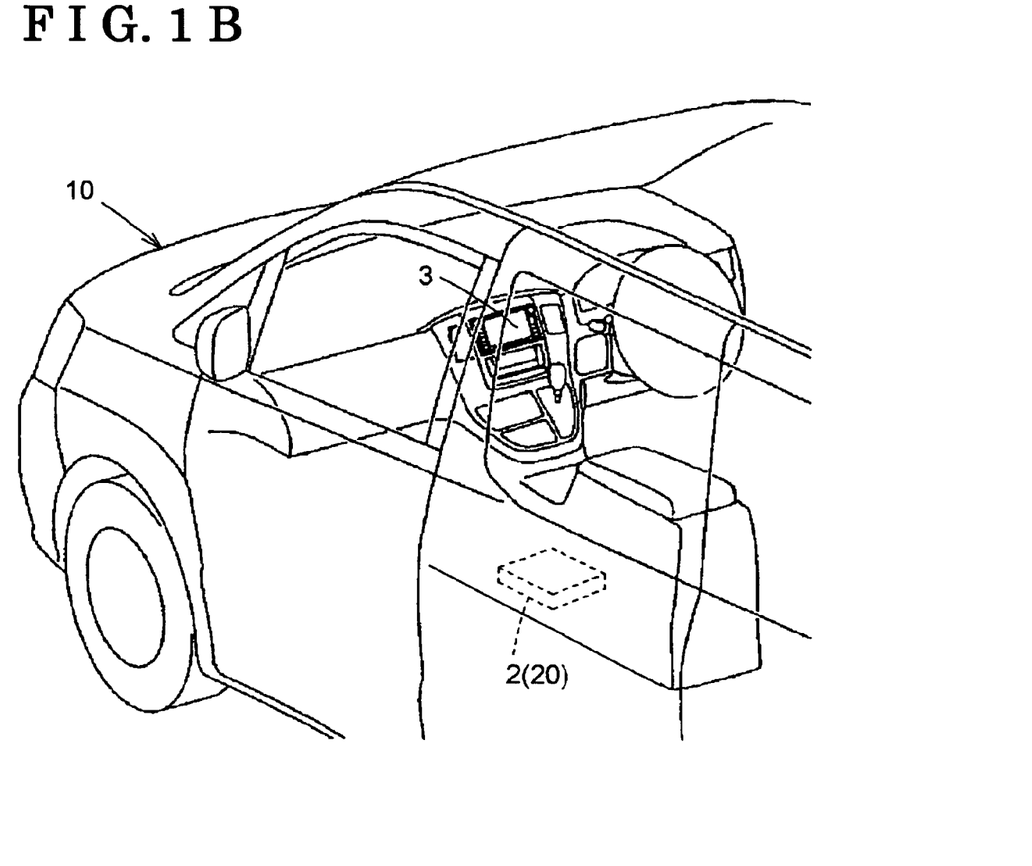

An embodiment of the present invention will be explained with reference to drawing figures. First, overview of the embodiment of the present invention will be explained. As illustrated in FIG. 1A, a monitoring system for surroundings of a vehicle according to the embodiment includes a camera 1 provided in the front of a vehicle 10. An image taken by the camera 1 is displayed on a monitor (display apparatus) 3 provided in a vehicle compartment illustrated in FIG. 1B. It is not problematical if a monitor provided for a navigation system is commonly utilized as the monitor 3. Here, in the embodiment, plural cameras 1 are provided. Images taken by the cameras 1 are synthesized by means of an image processing portion 20, in which a software and a hardware of an electronic control unit (ECU) 2 configured from a microcomputer cooperate, into a single image (synthesized image), and the synthesized image is displayed on the monitor 3.

Figure 2:
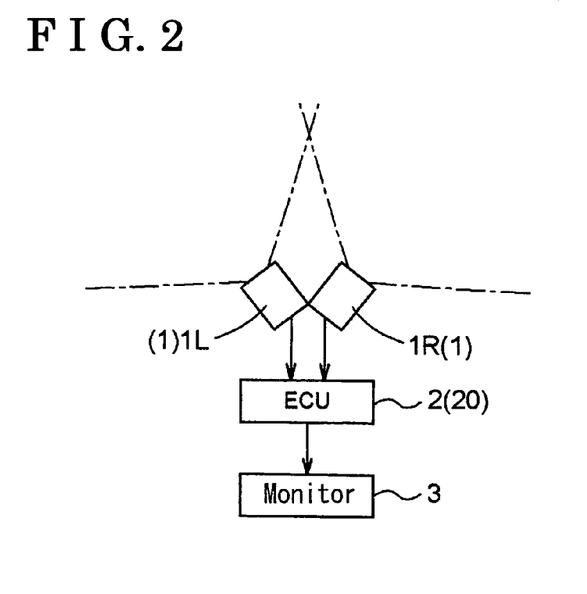
FIG. 2 represents a diagram illustrating an example of arrangement of cameras illustrated in FIG. 1A.

It is preferable that a view angle of the synthesized image is approximately from 180° to 200°, approximately the same as a view angle of human for a static object. In the embodiment, as illustrated in FIG. 2, a pair of cameras 1 (left camera 1L, right camera 1R), which can take images of wide field of view approximately 120°, is installed so as to have an overlapped view angle area for obtaining the single images of wide field of view. In addition, when the cameras 1 are installed horizontally, approximately the halves of the taken images are occupied by the sky. For avoiding this, the cameras 1 are installed with a certain depression angle from the horizontal position. Specifically, the cameras 1 are installed to have a depression angle approximately from 15° to 30°.

Generally, aberration of a lens tends to distort a taken image of wide field of view. Utilizing many cameras of a small view angle enables to take an image free from such distortion. However, utilizing such many cameras of a small view angle tends to increase the number of images which need to be synthesized together, which increases a burden of synthesis process. In the embodiment, as referred later, a method for synthesizing images, in which influences from distortions caused by such as aberration of lenses can be reduced, is employed. According to this method, an image of wide field of view can be made from images taken by the pair of cameras 1. Accordingly, the number of images to be synthesized becomes small. Therefore, without utilizing a microcomputer of high performance or the like, synthesis process can be performed at high rate and at low cost. In addition, the image of wide field of view can be obtained utilizing three cameras 1 (left camera 1L, center camera, right camera 1R), each having view angle of approximately from 70° to 90° for taking images, installed to have an overlapped view angle area.

Figure 3:
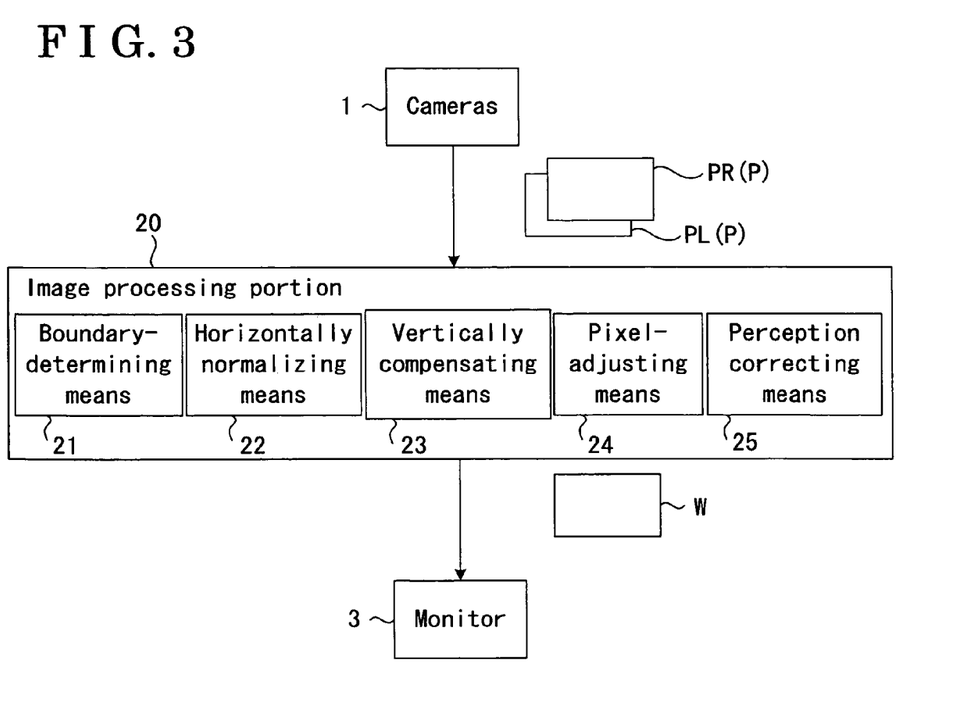
FIG. 3 represents a block diagram illustrating the monitoring system for monitoring the surroundings of the vehicle according to the embodiment of the present invention.

In following, as an example of the embodiment of the present invention, a monitoring system for monitoring surroundings of a vehicle, described above, for displaying taken images taken by the pair of cameras provided at the vehicle 10 on the display apparatus will be explained. FIG. 3 represents a block diagram illustrating the monitoring system for monitoring the surroundings of the vehicle according to the embodiment of the present invention. As illustrated in FIG. 3, images P (left image PL, right image PR) taken by the left camera 1L and the right camera 1R (plural cameras 1) are synthesized into one image (in other words, a first image PR and a second image PL taken by a first camera 1R and a second camera 1L are synthesized into one image) by means of an image processing portion 20 in which a software and a hardware of the ECU 2 configured from a microcomputer or the like cooperate. The synthesized image is displayed on the monitor 3. The image processing portion 20 includes a function for synthesizing images at least including a boundary-determining means 21 for determining a boundary of neighboring images taken by the plural cameras 1 for synthesizing the neighboring images in a horizontal direction by approximating the boundary to an exponential curve, a horizontally normalizing means 22 for normalizing the neighboring images in a horizontal direction so that the boundary approximated to the exponential curve is converted into a linear vertical boundary, a vertically compensating means 23 for compensating a vertical displacement between the neighboring images on the linear vertical boundary, and a pixel-adjusting means 24 for adjusting the number of pixels of the synthesized image to the number of pixels suitable for displaying the synthesized image produced by the image processing portion 20 on the monitor (display apparatus) 3. In addition, the image processing portion 20 can further include a perception correcting means 25 for obtaining an image of wide field of view W that gives few sense of strangeness to a user.

Figure 4:
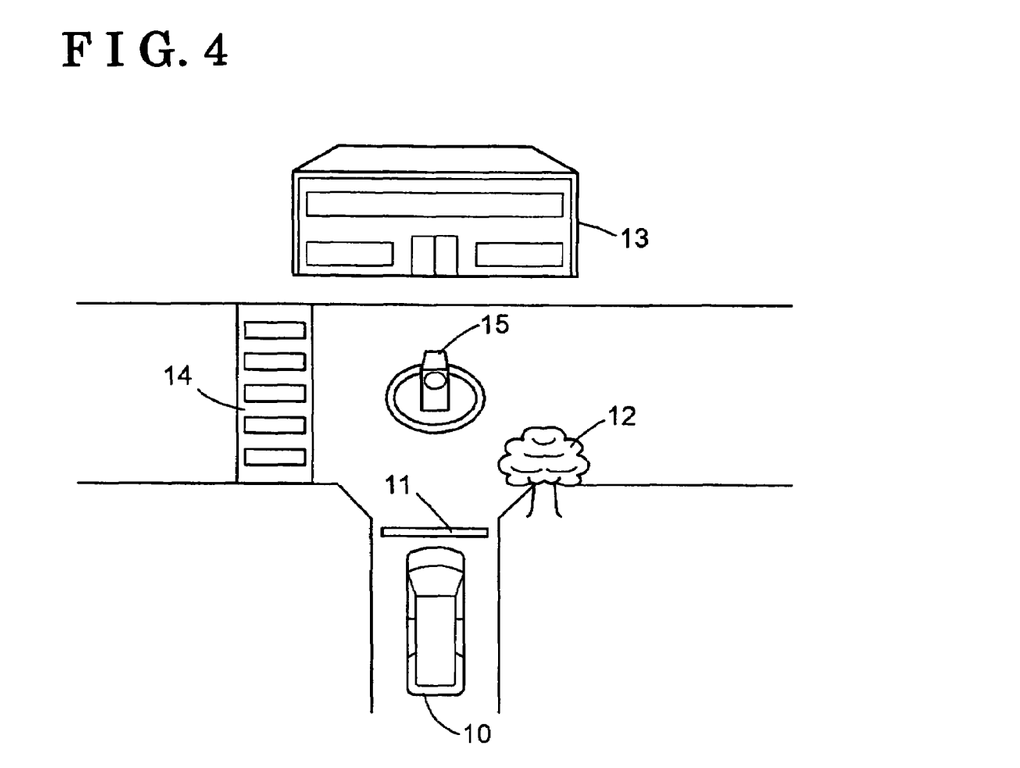
FIG. 4 represents an explanatory diagram illustrating a situation around the vehicle according to the embodiment of the present invention.

The synthesis process of the images performed by the image processing portion 20 will be explained with an example of a situation illustrated in FIG. 4. In FIG. 4, the vehicle 10 stops before a stop line 11 of a T-shape intersection before advancing into a main road from a branch road. As illustrated in FIG. 4, a roadside tree 12 is located to the right of the vehicle 10. A building 13 is located in front of the vehicle 10 across the main road into which the vehicle 10 intends to advance. An equipped object 15 is located at the center of the intersection. Further, a crossroad 14 is located at the left side (seen from the vehicle 10) of the main road.

Figure 5:
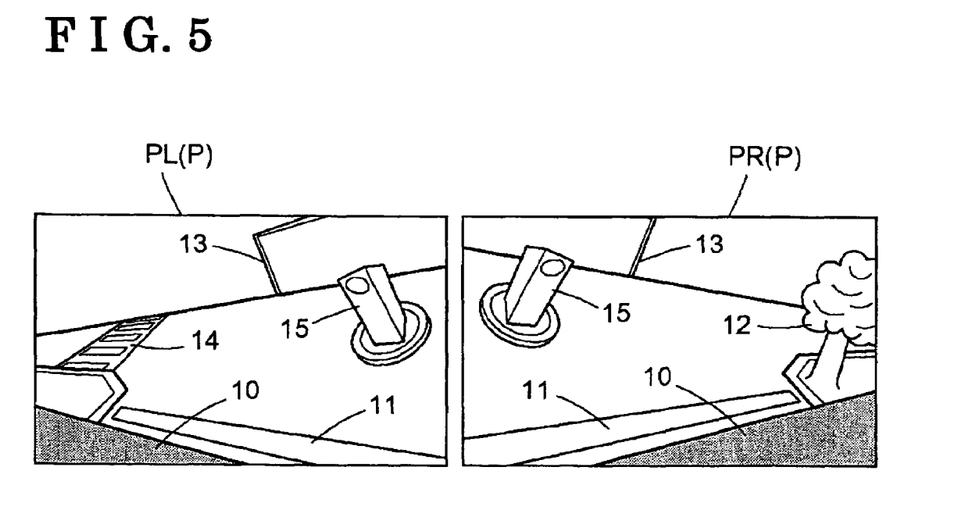
FIG. 5 represents a diagram illustrating an example of images taken by the cameras arranged as illustrated in FIG. 2 in the situation as illustrated in FIG. 4.
Figure 6:
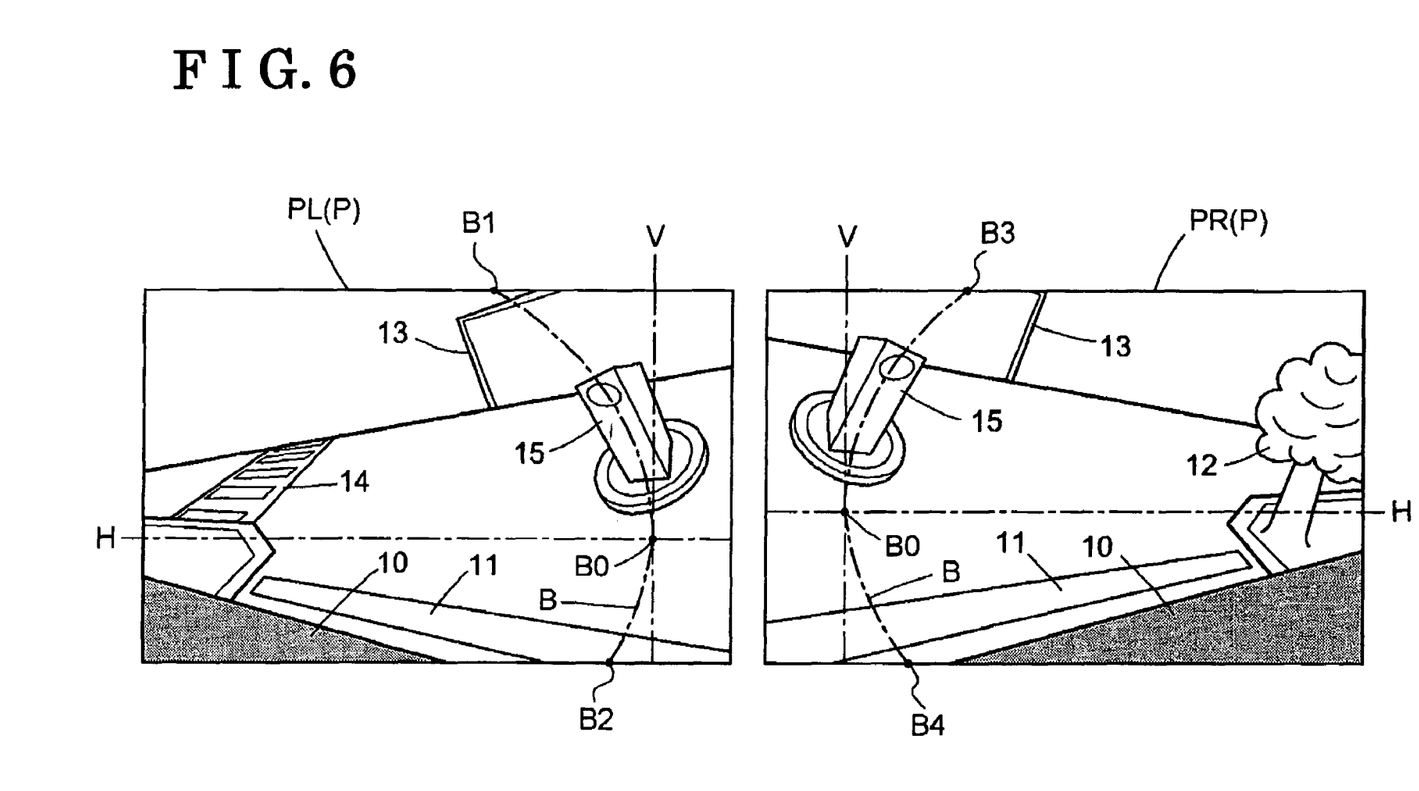
FIG. 6 represents an explanatory diagram for explaining a method for determining a curved boundary between the two images illustrated in FIG. 5.

Next, a boundary-determining process will be explained. As explained above, the pair of cameras 1 (left camera 1L, right camera 1R), which can take images of wide field of view in a view angle of approximately 120°, is installed with a certain depression angle of approximately from 15° to 20° from the horizontal position. These cameras 1 are installed to have an overlapped view angle area. As illustrated in FIG. 5, a common object is taken into each image PL, PR by the camera 1L, 1R. Further, each image PL, PR is distorted in different direction. The images PL, PR include a bumper portion of the vehicle 10 at the bottom of the images PL, PR. The right side of the image PL and the left side of the image PR need to be bound so that the image of wide field of view W is made from two images PL, PR. For doing this, as described later, degree of matching between the images PL, PR with referencing a road surface is calculated while varying relative position between the images PL and PR in a horizontal direction. A boundary B between the neighboring images, as illustrated in FIG. 6, is determined on the basis of the calculation of the degree of matching. When the boundary B is approximated to an exponential curve, tilts of the images caused by distortions or difference between viewpoints of the cameras can be corrected. In the embodiment, as referred later, the exponential curve is approximated by a quadratic function.

For obtaining the boundary B, a degree of matching in a horizontal direction between the images PL and PR neighboring each other is calculated. As can be seen from FIGS. 5 and 6, or as described above, the images PL and PR are distorted in different directions. Accordingly, the images PL and PR do not directly overlap together at high degree of matching. For overcoming this, flipping one of the images horizontal and overlapping the one with another can contribute to enhance the degree of matching of the images in the overlapping area of the view angles. Ideally, two cameras 1L and 1R should be installed without misalignments in relation to a horizontal position or a depression angle from the horizontal position. However, in actual, two cameras 1L and 1R are installed with some misalignment caused by unavoidable install error. Accordingly, the degree of matching is calculated while the relative position between images PL and PR is changed not only in a horizontal direction but also in a vertical direction.

As illustrated in FIG. 6, a horizontal reference line H is set on the images PL and PR at a predetermined vertical level. This horizontal reference line. H is normally set to indicate such as a height of the camera 1 from the ground or assumed viewpoint of a driver or the like. Ideally, the images PL and PR should have the horizontal reference line at the same position. However, the images PL and PR tend to have the horizontal reference line displaced each other in some degree caused by errors generated during installing the two cameras 1L and 1R.

The boundary B can be approximated to an exponential function with a quadratic function having a top on the horizontal reference line H. As can be seen from FIGS. 5 and 6, distortion of the images and directions of tilts are inversed across the horizontal reference line H. Therefore, as illustrated in FIG. 6, the boundary B becomes a curve having a top or an inflection point at a point B0. The boundary B can be approximated either to one quadratic function having a top at the horizontal reference line H or to two different quadratic functions, one for approximating the boundary B of upper side defined by the horizontal reference line H, the other for approximating the boundary B lower side defined by the horizontal reference line H, having a top at the same position. The top of the quadratic function is the point B0 illustrated in FIG. 6 in either approximation method utilizing one or two quadratic functions. In a horizontally normalizing process, described later, the images P are normalized so that the curved boundary is converted into a linear vertical boundary. In this time, utilizing a tangential line V at the point B0 illustrated in FIG. 6 as the vertical line can preferably avoid generation of distortion in the normalized images.

The curved boundary B indicated by an exponential curve nicely matches to physical phenomena, such as aberration of lens or difference between viewpoints of two cameras. However, strict matching cannot be expected in the system utilizing motion images made from 30 frames of images per one second. From this viewpoint, approximation of the boundary B to an exponential function by a quadratic function, which can be fitted to a part of a variation area of the exponential function at high degree, is preferable in terms of possibility of configuring simpler system.

Such quadratic functions for approximating the exponential function indicating the boundary B can be obtained by taking two neighboring images of a common object located on a road. For example, at the time of calibration, a straight line is drawn on the road from right under the cameras to forward. Then, the object is taken into images by the cameras.

Such object normally appears in the image like the curved line B1-B2 (B3-B4) illustrated in FIG. 6. Next, a point B0 on the horizontal reference line, an upper boundary point B1 (B3), and a lower boundary point B2 (B4) are determined with referencing to calculations of a degree of matching between the images P at the positions around an intersection of the curved line with the horizontal reference line H, the curved line around an upper end, the curved line around a lower end respectively. Then, a function of a curve is calculated which passes through these points B0, B1 (B3), B2 (B4). The curve can be considered as the boundary B. In this situation, it is preferable that a straight line of sufficient length is drawn, which appears in the images as the curved lines protruding from the images. However, even when the entire straight line is accommodated in the images, the boundary B can be obtained. When calculating the quadratic function, there are some occasions that a quadratic function, which has a top at the origin B0 and passes through both the upper boundary point B1 and the lower boundary point B2, does not exists. Accordingly, it is preferable that different quadratic functions are calculated for an upper side and lower side of the boundary B defined by the horizontal reference line B.

Suppose that x axis is defined in a horizontal direction, y axis is defined in a vertical direction, and the origin B0, the upper boundary point B1, the lower boundary point B2 are defined as follows in terms of x-y coordinates.

B0=(Xctr, Yctr)
B1=(Xtop, Ytop)
B2=(Xbtm, Ybtm)

Here, an upper side of the curve defined by the horizontal reference line H is described as follows.

$$X = a*Y^2 \quad \text{(Equation 1)}$$

Replacing X and Y by each coordinate of B0 and B1 yields a following result.

Xtop−Xctr=a*(Ytop−Yctr)$^2$

The equation is led to following.

a=−(Xctr−Xtop)/(Ytop−Yctr)$^2$

Thus, referencing equation 1, the upper side of the curve defined by the horizontal reference line H can be given as follows by simple calculation.

$$x = -((Xctr-Xtop)/(Ytop-Yctr)^2)*Y^2 \quad \text{(Equation 2)}$$

The lower side of the curve defined by the horizontal reference line H can be calculated similarly and given as follows.

$$x = -((Xctr-Xbtm)/(Yctr-Ybtm)^2)*Y^2 \quad \text{(Equation 3)}$$

Thus, an explanation for a method for calculating the boundary of the image PL taken by the left camera 1L is completed. A boundary of the image PR taken by the right camera 1R can be similarly calculated. Briefly, suppose that x-axis is defined in a horizontal direction, and y-axis defined in a vertical direction. Further, the origin B0, the upper boundary point B3, the lower boundary point B4 are defined in terms of the (x, y) coordinates. Then, the boundary can be calculated on the basis of the origin B0, the upper boundary point B3, and the lower boundary point B4. Accordingly, detailed explanation will be omitted. In addition, because the top of the quadratic function faces opposite direction, the constant "a" in equation 1 is positive. Calculation of such quadratic function can be performed by a microcomputer of not-high calculation performance without giving heavy burden on it, which is preferable in terms of increasing image processing rate and reducing cost of an apparatus.

Further, the curved boundary B can be constantly set without adverse effect once an installed position of the camera 1 is determined. Accordingly, a function of the curved boundary B can be calculated and stored in a memory portion or the like of the ECU 2 through an operation so called calibration when the camera 1 is installed to the vehicle or when the vehicle is checked or the like. Further, because the images taken by the cameras 1 is constant size (constant number of pixels), in-advance recordation of coordinate position of the curved boundary B is possible in the case that the microcomputer has not-high calculation performance but sufficient size of storage. In addition, the memory portion can be preferably configured from a recording medium rewritable at the time of calibration and information-retainable even at the condition of switch-off, such as a hard disk or a flash memory or the like.

Figure 7A:
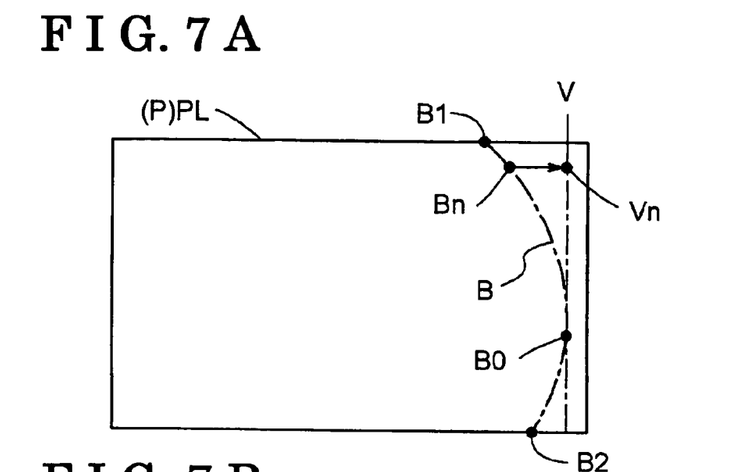
FIGS. 7A, 7B, and 7C represents explanatory diagrams for explaining some methods for converting the curved boundary illustrated in FIG. 5 into a linear vertical boundary.
Figure 7B:
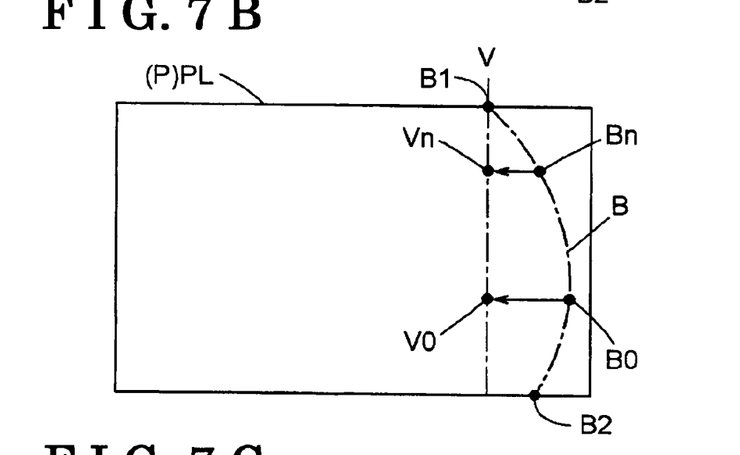
Figure 7C:
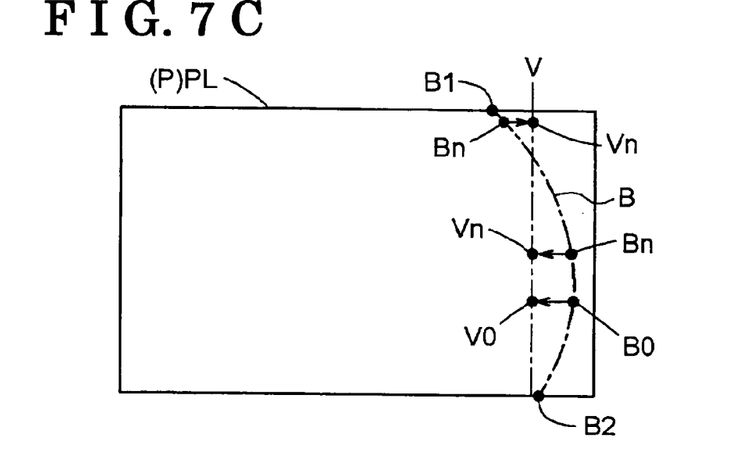

Next, a horizontally normalizing process will be explained. After the boundary B is determined, the images P are normalized in a horizontal direction so that the curved boundary B is converted into a linear vertical boundary V. Specifically, in the horizontally normalizing process, the horizontally normalizing means 22 executes expansion or compression of the pixels so that the number of pixels of the images P in all horizontal directions become equal after normalization for normalizing the pictures P. The normalization in a horizontal direction will be explained with reference to FIGS. 7A-7C and 8A-8B. Note that FIG. 7 illustrates only the image PL taken by the left camera 1L Several kinds of method can be employed for converting the curved boundary B into the linear vertical boundary V, as illustrated in FIGS. 7A-7C. FIG. 7A illustrates one of such methods for converting the curved boundary into a line passing through the point B0 (inflection point B0) on the curved boundary B. FIG. 7B illustrates another method for converting into a line passing through the upper boundary point B1 of the curved boundary B. FIG. 7C illustrates still another method for converting into a line crossing the curved boundary B. When the method for converting into a line passing through the inflection point B0 of the curved boundary B as illustrated in FIG. 7A is employed, for example, the image P (PL) is normalized so that a pixel Bn is transferred to a coordinate position of a pixel Vn. In other words, the number of pixels aligned along each horizontal line is expanded so that the number of pixels aligned along each horizontal line matches the number of pixels of the taken image P (PL) aligned from a left end portion to the inflection point B0. When the method for converting into a line passing through an intersection B1 between the curved boundary B and an upper end as illustrated in FIG. 7B is employed, inversely, the number of pixels aligned along each horizontal line is compressed so that the number of the pixels aligned along each horizontal line matches the number of pixels of the taken image P (PL) aligned from a left end portion to the point B1. When the method for converting into a line crossing the curved boundary B as illustrated in FIG. 7C is employed, the number of pixels is expanded or compressed depending on along which horizontal line the pixels is aligned. Here, the term "expanding the number of pixels" means increasing the number of pixels in a horizontal direction by creating new pixels not existing in the image into the image, and the term "compressing the number of pixels" means decreasing the number of pixels in a horizontal direction by removing extra. It is not problematical that the pixels is created or removed in a simple way. However, expansion and compression illustrated in FIGS. 8A and 8B can preferably preserve information of resolution or density or the like of the image in some degree after normalization.

Figure 8A:
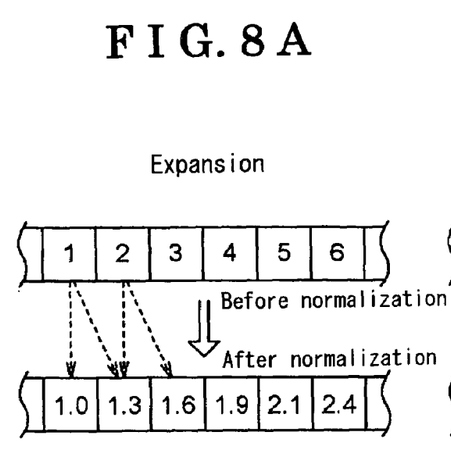
FIG. 8A represents a diagram illustrating a method for expansion performed in the process of converting illustrated in FIGS. 7A and 7C.
Figure 8B:
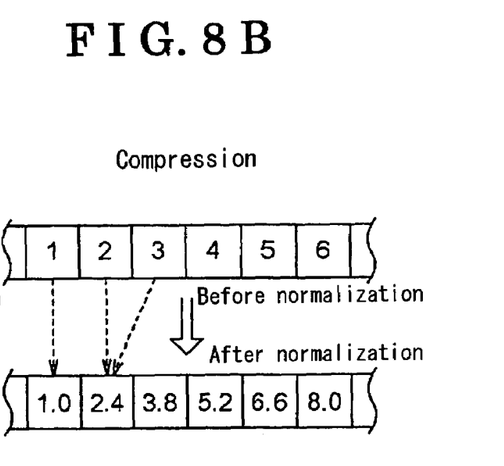
FIG. 8B represents a method for compression performed in the process of converting illustrated in FIGS. 7B and 7C.

As same as in the boundary-determining process, a coordinate table utilized in the horizontally normalizing process indicating positions of pixels to be expanded or compressed can be recorded in advance in the case where the microcomputer has not-high calculation performance but sufficient size of storage. It is preferable similarly to in the boundary-determining process that the memory portion is configured from a hard disk or a flush memory or the like. Note that data to be recorded is the coordinate table. A value of each pixel in relation to expansion, compression as illustrated in FIG. 8 is calculated each time of the horizontally normalizing process for each image.

Figure 9:
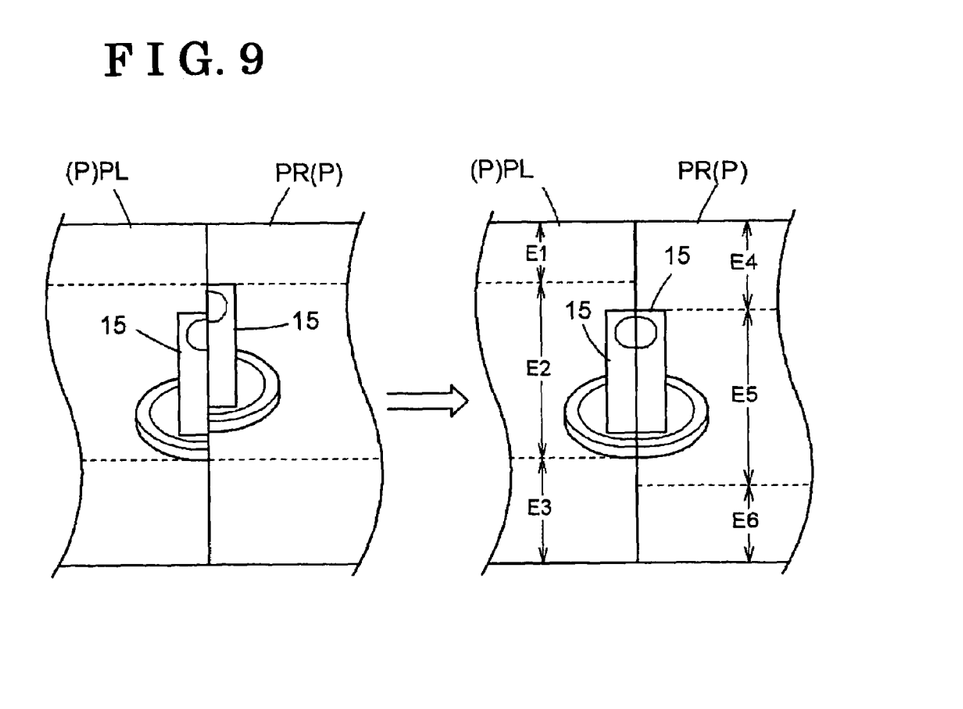
FIG. 9 represents an explanatory diagram for explaining a method for compensating a vertical displacement performed when the images are synthesized.

Next, a vertically compensating process will be explained. Though it is preferable that the left and right cameras 1 are installed so that the cameras 1 take the left and right images PL and PR of the same vertical level, the cameras 1 tend to take the left and right images PL and PR displaced in relation to a vertical position from an influence of misalignment generated during installing the cameras 1. For example, in FIG. 6, utilized in explanations of the boundary-determining method, the horizontal reference lines H in the left and right images PL and PR are located at different vertical level. Because the horizontally normalizing process only normalizes the curved boundary B into the linear vertical boundary V in a horizontal direction, a displacement in a vertical direction has not been corrected. Accordingly, when the normalized left and night images PL and PR are directly combined in a horizontal direction with matching a crossing point V0 of the horizontal reference line H and the boundary (linear vertical boundary V), a displacement at the vertical boundary V is generated as illustrated in FIG. 9. For correcting this displacement, the vertically compensating means 23 performs a vertically compensating process in which the displacement of the images PL and PR in a vertical direction is adjusted with a partial change of vertical scale of at least one of the neighboring images PL and PR.

FIG. 9 illustrates an example of the vertically compensating process, in which the horizontally normalized left image PL is maintained as it is and the vertical scale of the horizontally normalized right image PR is partially changed. Before the vertically compensating process, an area E1 of the left image and an area E4 of the right image have the same vertical length. The vertical length of the area E4 is enlarged through expanding process described above in a vertical direction. Thus, a displacement between the left and right images can be removed. Further, similarly, for an area E3 of the left image and an area E6 of the right image originally having the same vertical length, the vertical length of the area E6 is reduced through compressing process described above. Thus, a displacement of the left and right images is removed. In this example, though the area E2 and the area E5 is shifted in a vertical direction in accordance with the vertically compensating process performed to upper and lower area from the areas E2 and E5, vertical lengths of the area E2 and the area E5 have not changed. As described, it is not problematical that the process for enlargement or contraction is not conducted for some of areas. In addition, it is not problematical that the process for enlargement and contraction through the expansion process and the compression process is not conducted to the area uniformly. In other words, the area can be partially enlarged or contracted. Further, in the embodiment, for simple explanation, a vertical scale of only right image PR is partially changed, but it is not limited. Vertical scales of both of the images can be partially changed.

In relation to the vertically compensating process, in-advance recording of a coordinate table of the vertically compensating means is available if the vertically compensating process can be performed uniformly after the camera 1 is installed to a fixed position, which can increase processing rate.

Next, a pixel adjusting process will be explained. The image of wide field of view W combined as described above is transmitted to the monitor 3 after the number of pixels of the image of wide field view W is adjusted to the number of pixels suitable for displaying the synthesized image on the monitor 3 installed in the vehicle compartment, and displayed on the monitor 3. The image of wide field of view W is made by combining the images taken by two cameras 1. Accordingly, sometimes, the number of pixels of the synthesized image of wide field of view W tends to exceed the number of pixels displayable on the monitor 3 even when an overlapping portion of the images is eliminated. In this case, the number of pixels of the image of wide field of view W should be adjusted to the number of pixels displayable on the monitor 3. The adjustment can be performed in a similar way as in the horizontally normalizing process through expansion and/or compression. In another cases, the monitor 3 installed in the vehicle compartment has a wide screen being longer in a horizontal direction, which does not have a standard aspect ratio. The pixel-adjusting means 3 transmits the image of wide field of view W of which the number of pixels is adjusted in accordance with the screen of the installed monitor 3. In addition, it is needless to say that in-advance recording of a coordinate table in relation to the pixel-adjusting process is available on the basis of the number of pixels resulted from each process described above and the number of pixels of the monitor 3.

Figure 10:
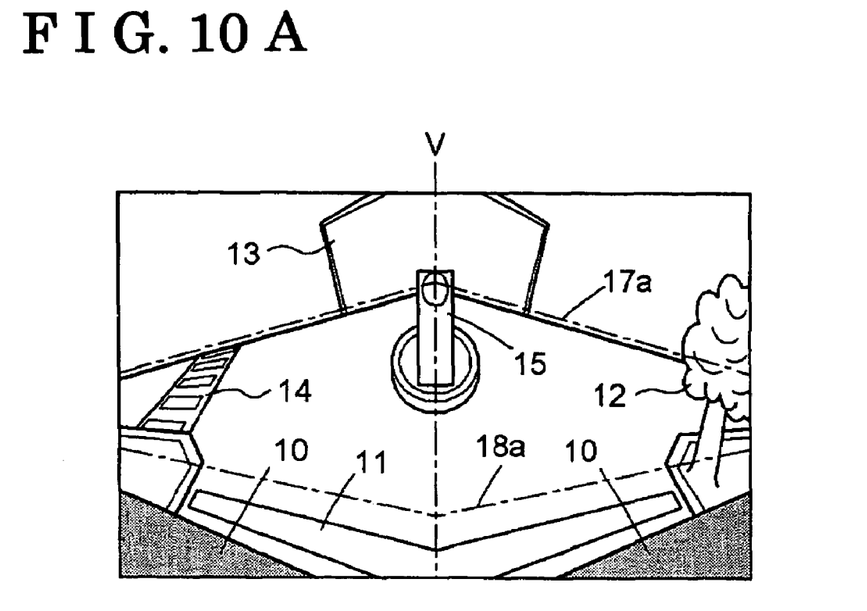
FIG. 10A represents an explanatory diagram for explaining a perception correcting method performed for the synthesized image (before correction)
FIG. 10B represents an explanatory diagram for explaining the perception correcting method performed for the synthesized image (after correction)

Next, a perception correcting process will be explained. Sometimes, as illustrated in FIG. 10A, in the synthesized image of wide field of view, a far horizontal line 17a and a near horizontal line 18a are linearly imaged. In other words, the far horizontal line 17a inclines downward from the upper portion of the linear vertical boundary V toward at the middle of the right and left end of the synthesized image. On the other hand, the near horizontal line 18a inclines upward from the lower portion of the linear vertical boundary V toward at the middle of the right and left side of the synthesized image. Accordingly, the far horizontal line 17a shapes like an umbrella, the near horizontal line 18a shapes like an upside-down umbrella. Then, the image includes a lozenge-shaped space shaped by these two horizontal lines in the middle of the image. The image is inconsistent with human perception, and it gives a sense of strangeness to a user.

The perception correcting process is performed by the perception correcting means 25 provided at the image processing means 20 as follows. In the perception correcting process, the far horizontal line 17a linearly imaged in the images taken by the plural cameras is corrected to one consecutive circularly curved line in the synthesized image. The curved line has a center at a downward position in a vertical direction of the synthesized image. Simultaneously, gin the perception correcting process, the near horizontal line 18a linearly imaged in the images taken by the plural cameras is corrected to another consecutive circularly curved line in the synthesized image. The consecutive line described secondly has a center at an upward position in a vertical direction of the synthesized images and has a curvature greater than that of the one consecutive circularly curved line. Thus, a synthesized image consistent with perception of a user and not giving strangeness to the user can be obtained.

It is not problematical that a process according to the perception correcting process is performed simultaneously with the horizontally normalizing process. In other words, it is preferable that the horizontally normalizing process does not performs uniform expansion and compression in a horizontal direction, but performs setting of pixel positions through expansion and compression so that the far horizontal line 17a and the near horizontal line 18a are corrected to a circular shape.

As described above, the perception correcting process can be performed independently or concomitantly with other process such as the horizontally normalizing process. Further, similarly to each process described above, a coordinate table in relation to the correction can be recorded in advance.

As described above, according to the embodiment of the present invention, a monitoring system for monitoring surroundings of the vehicle can be provided which enables a driver to grasp surroundings of the vehicle as wide as possible at a glance without feeling perceptional strangeness.

The embodiment of the present invention can be applied to a monitor system for monitoring surroundings of a vehicle for displaying a circumstance around the vehicle. The circumstance described above is displayed in a vehicle compartment. For applications of the monitor system for monitoring surroundings of a vehicle, a back monitor utilized when moving the vehicle backward, a monitor for monitoring under the front part of a bumper, and a monitor for monitoring a blind corner, or other applications like that, can be explained.

According to an aspect of the present invention, a monitoring system for monitoring surroundings of a vehicle by displaying images taken by a plurality of cameras provided at the vehicle on a display apparatus provided in a vehicle compartment includes an image processing portion. The image processing portion includes a boundary-determining means for determining a boundary of the neighboring images taken by the plurality of cameras for synthesizing the neighboring images in a horizontal direction by approximating the boundary to an exponential curve, a horizontally normalizing means for normalizing the neighboring images in a horizontal direction so that the boundary approximated to the exponential curve is converted into a linear vertical boundary, a vertically compensating means for compensating a vertical displacement between the neighboring images on the linear vertical boundary, and a pixel-adjusting means for adjusting the number of pixels of the synthesized image to the number of pixels suitable for displaying the synthesized image produced by the image processing portion on the display apparatus.

When the image is synthesized from images taken by the plural cameras to have wide view angle in a horizontal direction, a boundary of the neighboring images need to be determined. According to the aspect of the present invention described above, the boundary of the neighboring images is approximated to an exponential function, which preferably corresponds to a property of lenses of the cameras. Accordingly, a distortion of the images, generated when being taken by the cameras utilizing lenses of wide field of view, can be taken into consideration for removing it when determining the boundary. Further, utilizing the determined boundary can correct a tilt of the image caused by difference in a viewpoint of the cameras. Accordingly, the number of cameras installed in a horizontal direction of the vehicle can be small, two or three, which makes the number of images to be synthesized small. Accordingly, the amount of calculation for synthesize can be small. Further, it is preferable to utilize a quadratic function or the like for approximating the exponential function because the amount of calculation can be smaller and the quadratic function can preferably approximate the exponential function. Further, in the process of normalizing pixels in a horizontal direction for converting the determined boundary into the linear vertical boundary, utilizing the quadratic function simplifies calculation for coordinate position in a horizontal direction. Accordingly, a microcomputer or the like having high calculation performance is not necessarily required for configuring the system described above, which can reduce an energy consumption and cut cost. Further, in such a case that a motion image is displayed, in which 30 frames or more images per second are in general required, the simple calculation according to the aspect of the present invention is advantageous because of its short processing time. Thus, the calculation according to the aspect of the present invention can be preferably applied to synthesis of the motion image. Further, according to the aspect of the present invention, a displacement of the images in a vertical direction on the linear boundary is corrected, and the number of pixels of the synthesized image is adjusted to the number of pixels suitable for displaying the synthesized image on the display apparatus. Accordingly, the synthesized image, which does not give a sense of strangeness to the user, can be obtained.

According to a further aspect of the present invention, it is preferable that each image taken by the cameras includes a horizontal reference line at a predetermined vertical level of the image, and the boundary-determining means approximates the boundary of upper side defined by an inflection point which is a crossing point of the horizontal reference line and the boundary using a function and the boundary of lower side defined by the inflection point using a different function.

Generally, the cameras are installed to have a slight depression angle from the horizontal position when utilized for taking images of the surroundings of the vehicle. Accordingly, the ground is imaged at lower side of the images, and the sky or equipments on the ground such as buildings are imaged at upper side of the images. When a predetermined vertical position of the images, which almost corresponds to a height of the installed cameras, is taken as a horizontal reference, the images lower than the horizontal reference images objects placed lower than the installed cameras. Generally, the most of the image lower than the horizontal reference images the ground. Further, the images higher than the horizontal reference images object placed higher than the installed cameras, in other words, equipment on the ground. Thus, depending on an angle between the direction from the installed camera to the position where the object taken into the image is placed and the direction that the installed cameras are facing, infection of the boundary varies in upper and lower images defined by the horizontal reference line. The inflection point can be a top of one quadratic function. However, in frequent situation that the cameras are installed to have a depression angle from the horizontal position, distances from the cameras to objects imaged in the upper side and lower side of the images taken by the cameras tends to be different in high probability. Accordingly, utilizing one quadratic function increases possibility of generating large amount of error. For compensating this, it is preferable that the exponential function approximating the boundary of upper side defined by the inflection point which is a crossing point of the horizontal reference line and the boundary is approximated using a function, for example, a quadratic function, and the exponential function approximating the boundary of lower side defined by the inflection point is approximated using a different function, because appropriate boundary can be determined for the upper part and the lower part of the images respectively. Though two kinds of function is utilized in the system such configured, calculations of functions utilized for approximation can be simple, which does not increase burden for calculation. In particular, when quadratic functions are utilized for approximation, calculations become touch simple. Thus, error of the determined boundary utilized for synthesizing the image can be small.

According to a further aspect of the present invention, it is preferable that the horizontally normalizing means at least executes one of expansion and compression of the pixels so that the number of pixels of the images in all horizontal directions becomes equal after normalization.

Because the horizontally normalizing means at least executes one of expansion of the pixels, in which the number of pixels is increased by creating new pixels, and compression of the pixels, in which the number of pixels is decreased by removing extra, so that the number of pixels of the images in all horizontal directions becomes equal after normalization, the horizontally normalizing means can normalize the image without large loss of resolution and/or density of the images taken by the cameras.

According to a further aspect of the present invention, it is preferable that normalized images are combined on the vertical line vertically passing through the horizontal reference line by matching the crossing points of the horizontal reference line and the boundary of the neighboring images and a displacement of the images in a vertical direction is adjusted with a partial change of vertical scale of at least one of the neighboring images when the normalized images are combined.

Depending on the installed angle of the camera or the like described above, a scale is not uniform even in one image taken by one camera. Accordingly, when there is a displacement on the linear vertical boundary of the synthesized image, to adjust the displacement by changing a scale of entire synthesized image is difficult. It is preferable that the displacement is adjusted by not entire but partial change of the vertical scale.

According to a further aspect of the present invention, the image processing means further comprises a perception correcting means for correcting a perception of a user of the system by changing a far horizontal line linearly imaged in each image taken by the plurality of cameras to one consecutive circularly curved line in the synthesized image and by changing a near horizontal line linearly imaged in each image taken by the cameras to another consecutive circularly curved line, curvature of which is greater than that of the one consecutive circularly curved line so that the perception of the user may be corrected.

The images taken by the cameras can be corrected in some degree by the curved boundary approximated by the exponential function and by the normalizing process for converting the curved boundary into the linear vertical boundary. However, in some cases, the far horizontal line and the near horizontal line are linearly imaged in the synthesized image after the normalizing process as follows. Specifically, the far horizontal line inclines downward from the upper portion of the linear vertical boundary toward at the middle of the right and left end of the synthesized image. On the other hand, the near horizontal line inclines upward from the lower portion of the linear vertical boundary toward at the middle of the right and left side of the synthesized image. Accordingly, the far horizontal line shapes like an umbrella, the near horizontal line shapes like an upside-down umbrella. Then, the synthesized image includes a lozenge-shaped space shaped by these two horizontal lines in the middle of the synthesized image. Such image is inconsistent with human perception, and it gives a sense of strangeness to a user. For correcting such inconsistency, according to the aspect of the present invention, the perception correcting means for performing a perception correcting process is provided. In the perception correcting process, the far horizontal line linearly imaged in the images taken by the plural cameras is corrected to one consecutive circularly curved line in the synthesized image. The curved line has a center at a downward position in a vertical direction of the synthesized image. Simultaneously, in the perception correcting process, the near horizontal line linearly imaged in the images taken by the plural cameras is corrected to another consecutive circularly curved line in the synthesized image. The consecutive line described secondly has a center at an upward position in a vertical direction of the synthesized images and has a curvature greater than that of the one consecutive circularly curved line. Thus, a synthesized image consistent with perception of a user and not giving strangeness to the user can be obtained.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A monitoring system for monitoring surroundings of a vehicle by displaying images taken by a plurality of cameras provided at the vehicle on a display apparatus provided in a vehicle compartment, comprising:
   an image processing portion including:
   a boundary-determining means for determining a boundary of the neighboring images taken by the plurality of cameras for synthesizing the neighboring images in a horizontal direction by approximating the boundary to an exponential curve;
   a horizontally normalizing means for normalizing the neighboring images in a horizontal direction so that the boundary approximated to the exponential curve is converted into a linear vertical boundary;
   a vertically compensating means for compensating a vertical displacement between the neighboring images on the linear vertical boundary; and
   a pixel-adjusting means for adjusting the number of pixels of the synthesized image to the number of pixels suitable for displaying the synthesized image produced by the image processing portion on the display apparatus.

2. The monitoring system for monitoring the surroundings of the vehicle according to claim 1, wherein
   each image taken by the cameras includes a horizontal reference line at a predetermined vertical level of the image, and the boundary-determining means approximates the boundary of upper side defined by an inflection point which is a crossing point of the horizontal reference line and the boundary using a function and the boundary of lower side defined by the inflection point using a different function.

3. The monitoring system for monitoring the surroundings of the vehicle according to claim 1, wherein
   the horizontally normalizing means at least executes one of expansion and compression of the pixels so that the number of pixels of the images in all horizontal directions becomes equal after normalization.

4. The monitoring system for monitoring the surroundings of the vehicle according to claim 2, wherein
   normalized images are combined on the vertical line vertically passing through the horizontal reference line by matching the crossing points of the horizontal reference line and the boundary of the neighboring images and a displacement of the images in a vertical direction is adjusted with a partial change of vertical scale of at least one of the neighboring images when the normalized images are combined.

5. The monitoring system for monitoring the surroundings of the vehicle according to claim 1, wherein
the image processing means further comprises a perception correcting means for correcting a perception of a user of the system by changing a far horizontal line linearly imaged in each image taken by the plurality of cameras to one consecutive circularly curved line in the synthesized image and by changing a near horizontal line linearly imaged in each image taken by the cameras to another consecutive circularly curved line, curvature of which is greater than that of the one consecutive circularly curved line.

6. A monitoring system for monitoring surroundings of a vehicle by displaying images of the surroundings of the vehicle taken by a first camera and a second camera provided at the vehicle on a display apparatus provided in a vehicle compartment, comprising:
an image processing portion including:
a boundary-determining means for determining a boundary of neighboring first image taken by the first camera and second image taken by the second camera for synthesizing the neighboring first image and the second image in a horizontal direction by approximating the boundary to an exponential curve;
a horizontally normalizing means for normalizing the neighboring first image and second image in a horizontal direction so as to be converted the boundary approximated to the exponential curve into a linear vertical boundary;
a vertically compensating means for compensating a vertical displacement between the neighboring first image and second image on the linear vertical boundary; and
a pixel-adjusting means for adjusting the number of pixels of the synthesized image to the number of pixels suitable for displaying the synthesized image produced by the image processing portion on the display apparatus.

7. The monitor system for monitoring the surroundings of the vehicle according to claim 6, wherein
the first camera and the second camera are installed with a certain depression angle from the horizontal position and to have an overlapped view angle area of the first camera and the second camera.

8. The monitoring system for monitoring the surroundings of the vehicle according to claim 6, wherein
the normalization of the horizontal normalization means includes at least one of extension of the pixel to increase the number thereof by creating new pixels and compression of the pixel to decrease the number thereof by removing extra pixels.

9. The monitoring system for monitoring the surroundings of the vehicle according to claim 6, wherein
a horizontal reference line is set in each first image and second image at a predetermined position in a vertical direction.

10. The monitoring system for monitoring the surroundings of the vehicle according to claim 9, wherein
the exponential curve has an inflection point at an intersection with the horizontal reference line.

11. The monitoring system for monitoring the surroundings of the vehicle according to claim 8, wherein
the exponential function is obtained by calculating a degree of matching between overlapping portion of the neighboring images taken by the first camera and the second camera.

12. The monitoring system for monitoring the surroundings of the vehicle according to claim 9, wherein
an upper boundary point and a lower boundary point are calculated on the basis of a calculation of a degree of matching between the neighboring images, the exponential function is calculated on the basis of the horizontal reference line, the upper boundary point, and the lower boundary point, and the horizontally normalizing means conducts normalization on the basis of the exponential function.

* * * * *